United States Patent [19]

Dacey, Jr.

[11] Patent Number: 5,072,506
[45] Date of Patent: Dec. 17, 1991

[54] POSITION SEEKING APPARATUS

[75] Inventor: Ernest A. Dacey, Jr., Highland, Mich.

[73] Assignee: Utica Enterprises, Inc., Sterling Heights, Mich.

[21] Appl. No.: 516,554

[22] Filed: Apr. 30, 1990

[51] Int. Cl.$^5$ ............................................. B23P 19/00
[52] U.S. Cl. ....................................... 29/464; 29/712; 29/714
[58] Field of Search ............... 29/33 K, 430, 464, 701, 29/705, 707, 709, 712, 714, 720; 408/13, 79, 235

[56] References Cited

U.S. PATENT DOCUMENTS 4,813,125 3/1989 Dacey, Jr. ............................ 29/714

FOREIGN PATENT DOCUMENTS

144912 11/1980 Japan ..................................... 408/13

Primary Examiner—Steven C. Bishop
Attorney, Agent, or Firm—Remy J. VanOphem

[57] ABSTRACT

An apparatus for locating a reference target on a partially assembled structure such as an automobile body frame. The apparatus has a base support structure for rigid mounting to a floor member, a transfer platform is attached to the base structure so that the transfer platform has freedom of movement in a first horizontal direction; a horizontal slide assembly is attached to the transfer platform so that it has freedom of movement in a horizontal direction perpendicular to the first horizontal direction; and a vertical slide assembly is attached to the horizontal slide assembly and is movable therewith in a vertical direction. An acutator and a clamp bar are utilized to immobilize the transfer platform, and an actuator and a clamp plate are utilized to immobilize both the horizontal and vertical slide assemblies. A plurality of work tools or tool receiving recesses are attached to the vertical slide assembly so that the tool and recess can move toward and away from the automobile body frame.

67 Claims, 5 Drawing Sheets

POSITION SEEKING APPARATUS

BACKGROUND OF THE INVENTION

1. Field of the Invention

The present invention relates to an apparatus for establishing a position relative to one or more reference points on an object. More particularly, the invention relates to an apparatus for interaction with a target on a member such as, for example, an automobile body where variations in the target position can be accommodated by the apparatus. After the apparatus has interacted with the target, its position is immobilized so the work can be accomplished on the automobile body in relationship to the target position.

2. Description of the Prior Art

An apparatus for establishing a datum position from an object having dimensional variations is set forth in U.S. Pat. No. 4,813,125, entitled "Method and Apparatus for Establishing the Position of a Datum Reference from an Object Having Dimensional Variations within a Tolerance Range", issued Mar. 21, 1989, to Ernest A. Dacey, Jr. The apparatus of the above referenced patent includes a fixed base structure for rigid mounting to a floor adjacent to an assembly line. A transfer platform is movably attached to the base support structure so that the transfer platform can move in a horizontal direction with respect to the fixed base structure. A support structure assembly is attached to the transfer platform. The assembly can move in a horizontal direction perpendicular to the direction of movement of the transfer platform. A vertical slide assembly is attached to the support structure assembly so that it can move in a vertical direction. Fluid actuated positioning and locating members are attached to the apparatus so that the horizontal and vertical movements can be immobilized subsequent to the attainment of a correct position by utilization of a plurality of probes. The immobilization of each axis of movement of the apparatus is achieved by the action of a pair of opposed fluid driven actuators; thus, to immobilize three axes of movement, six actuators are required.

In U.S. Pat. No. 4,589,199, which issued on May 20, 1987, in the name of Keizaburo Ohtaki et al, an apparatus for assembling an automobile body door is set forth. The patent discloses a set jig that is supported on a shift table positioned adjacent to an automobile assembly line that accommodates automobile components such as the incomplete body structure. The apparatus described in U.S. Pat. No. 4,589,199 is dedicated to the installation of automobile door assemblies to predetermined attachment points that have been established on the automobile body framework. The jig can move from front to rear along the automobile body framework. The movement of the jig is further enhanced by a three-dimensional, right angled coordinate type robot mechanism that is movable with respect to the width and length as well as the height of the automobile body structure. The robot mechanism is provided on a shift table that has a first frame capable of moving along the length of the automobile body. A second movable frame, which is attached to the first frame, is movable in the automobile body width direction. A third movable frame, which is attached to the second frame, is movable in the automobile body height direction.

The robot mechanism can additionally support a door assembly and move it into the proper assembly position on the automobile body. In order to compensate for variations in the location of the door attachment point on the automobile body, a probe is moved into engagement with the door attachment point on the automobile body. If the probe detects any deviation in the location of the door attachment point as compared to where it should be located, the deviation is communicated through electrical means to the robot mechanism so that it can compensate as it moves the door into an attachment position.

Thus, it can be realized that while the above described apparatus permits automobile body deviations to be taken into account during the assembly of a door, the deviation from the normal attachment point must be first ascertained. Then after the probe has been moved into and out of engagement with the automobile body, the actual task of swinging the door panel into an acceptable attachment location can be undertaken. Also, a normal reference point must be established on the assembly line, the automobile body, or both so the probe can successfully calculate the deviation and communicate such deviation to the three axes positioning portion of the apparatus.

A programmable manipulator is described and illustrated in U.S. Pat. No. 4,086,522, which issued on Apr. 25, 1978, in the name of Joseph F. Engelberger et al. The apparatus set forth in this patent is useful in performing welding functions during the assembly of an automobile body frame. The manipulator relies on a complex electrical program with memory retention capacity to store a series of statically taught work positions that are acquired from a stationary workpiece. The computer stored information is then used as a comparison base when the manipulator apparatus is utilized on a moving automobile body assembly line.

Since the manipulator apparatus described in the above mentioned patent forms its motion in accordance with an internally retained memory program, it is difficult to precisely control the location of a tool that is held by the manipulator arm. Variations in automobile bodies is a fact and once the body dimensions move outside the range of the prerecorded deviations, time must be taken to reprogram the memory of the manipulator apparatus so that work on a moving conveyor line can resume. Such recalibration procedure is costly and time consuming in that the conveyor line must be stopped while the memory bank is being reprogrammed.

SUMMARY OF THE INVENTION

According to the present invention, there is provided a mechanical device for establishing a reference position from an object having dimensional variations within a tolerance range. The mechanical device is then immobilized with respect to the reference position and useful work is then performed on the object with respect to the reference position.

The apparatus of the present invention includes a fixed base structure for rigid mounting to, for example, a floor adjacent to an automobile assembly line. A transfer platform is movable relative to the base structure so that the transfer platform can move in a horizontal direction with respect to the fixed base structure. A horizontal slide assembly is attached to the transfer platform which is adapted to move in a horizontal direction perpendicular to the direction of movement of the transfer platform. A vertical slide assembly is movably attached to the horizontal slide assembly and is movable therewith in a vertical direction. A fluid activated member is attached to the transfer platform for immobilizing its movement with respect to the base structure. A fluid driven actuator is attached to the support structure on the vertical slide assembly to immobilize the vertical slide assembly and the horizontal slide assembly, and at least one probe is attached to the apparatus for locating a preestablished variable reference surface from which the reference position is established.

The invention also encompasses at least one work performing tool attached to the apparatus so that it can perform useful work on the object from which the reference position is established.

Additionally, the present inventive concept includes a separate tool assembly that can be coupled to a socket or reentrant portion of the overall apparatus subsequent to the positioning of the overall apparatus with respect to a vehicle body.

A principal object of the present invention is to provide a new and improved apparatus for locating a relatively imprecisely located reference position on an object undergoing assembly.

Another object of the present invention is to provide a new and improved apparatus that is easy to construct and manipulate while providing a rapid technique for locating a reference position in space and accomplishing work on the object at a location remote from the reference position but in relationship thereto.

A further object of the present invention is to provide an apparatus that has fewer parts than prior art devices, has an extended service life and yet is easy to repair and maintain.

Still another object of the present invention is to provide an apparatus that can interact with an automobile body element and select a given reference position with respect thereto and establish and maintain the reference position while work is performed on the automobile body.

Another object of the present invention is to provide an apparatus that relies on one or more fluid drive means for accomplishing part of its motion relative to an adjacent workpiece.

An additional object of the present invention is to provide an apparatus that has freedom of movement in three axes to establish a reference position, yet is relatively safe for incorporation into an assembly line environment.

Yet another object of the present invention is to provide an apparatus that has incorporated therein at least one work tool that is responsive to a reference that has been located and held by the apparatus for a time interval sufficient to permit the tool to accomplish its task and be withdrawn from the proximity of the object being worked on.

Another object of the present invention is to provide an apparatus that includes a socket or recess for the coupling of a tool assembly.

Also, another object of the present invention is to utilize one fluid driven actuator to immobilize movement of a portion of the apparatus in more than one direction.

A further object of the present invention is to utilize two fluid driven actuators coupled in tandem to control the movement of the apparatus in at least one plane of movement.

Another object of the present invention is to utilize a single probe to interact with a target reference position on an object, thus controlling the movement in three planes of an object to which the probe is attached.

Further objects and advantages of the present invention will become apparent from the following description and the appended claims, reference being made to the accompanying drawings forming a part of this specification, wherein like reference characters designate corresponding parts in the several views.

DETAILED DESCRIPTION OF THE PREFERRED EMBODIMENT

Figure 1:
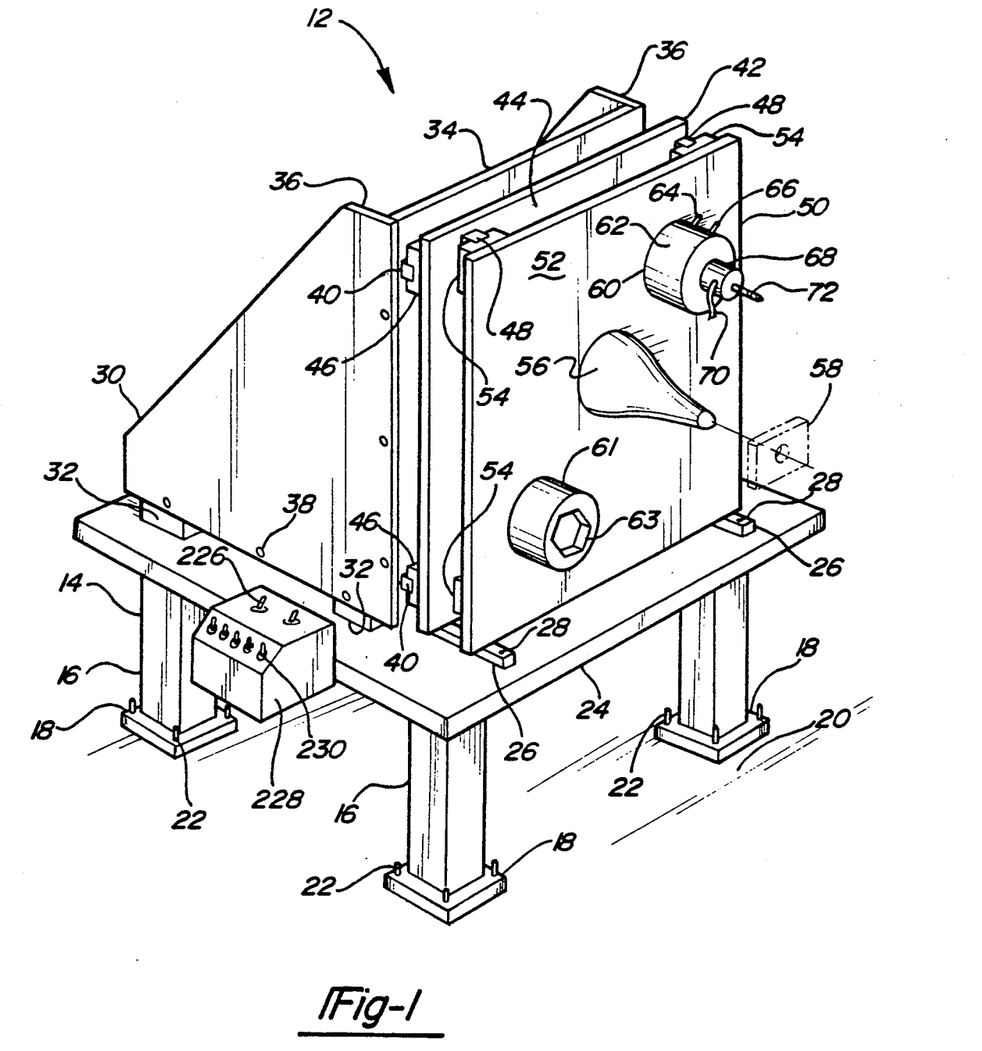
FIG. 1 is a front perspective view of a preferred embodiment of the apparatus according to the present invention.

Referring now to the drawings and more particularly to FIG. 1, there is illustrated in perspective a front and side view of a preferred embodiment of the present invention. The overall apparatus is referenced by the numeral 12. The overall apparatus 12 has a base structure 14 that encompasses a plurality of upstanding support legs 16. The support legs 16 terminate at their lower extremities with support pads 18. In order to provide a stable and relatively immobile structure, the support pads 18 are anchored to a floor 20 by appropriately designed anchor fasteners 22. A top plate 24 is attached to the top ends of the support legs 16 by appropriate means. Two slide rails 26 are oriented parallel to each other and are anchored to the top surface of the top plate 24 by welding or fasteners, such as bolts 28.

A transfer platform 30 is positioned above and in spaced relationship to the top plate 24 of the base structure 14. The transfer platform 30 has a plurality of bearing pads 32 attached to the bottom thereof. The bearing pads 32 are arranged in spaced apart pairs and each pair of bearing pads 32 is positioned so as to interact and engage with one of the slide rails 26. Thus, it can be seen that the transfer platform 30 has one degree of horizontal movement that is substantially parallel to the planar top surface of the top plate 24. The horizontal movement of the transfer platform 30 shall hereinafter be referred to as the horizontal movement that is perpendicular to the direction of travel of a vehicle assembly line.

The transfer platform 30 has a vertically disposed support plate 34 attached to its leading edge. The support plate 34 is additionally stabilized and anchored to the transfer platform 30 by side plates 36. The side plates 36 are held firmly in position by a plurality of fasteners 38. The support plate 34 has attached thereto a pair of horizontally disposed slide rails 40. The slide rails 40 are positioned near the top and bottom edges of the support plate 34.

A horizontal slide assembly 42 is positioned in juxtaposed relationship with respect to the support plate 34 of the transfer platform 30. The horizontal slide assembly 42 has a vertically aligned intermediate plate 44 that is essentially parallel to the support plate 34. The intermediate plate 44 has two pairs of bearing pads 46 fastened thereto by means of appropriate fasteners. The bearing pads 46 interact with the slide rails 40, permitting the horizontal slide assembly 42 to move in a horizontal direction that is perpendicular to the horizontal movement of the transfer platform 30. A pair of parallel vertically oriented slide rails 48 are attached to the front surface of the intermediate plate 44.

A vertical slide assembly 50 is positioned in spaced apart relationship with respect to the intermediate plate 44 of the horizontal slide assembly 42. A forward plate 52 forms a substantial portion of the vertical slide assembly 50. Two pairs of bearing pads 54 are attached to the rear surface of the forward plate 52 of the vertical slide assembly 50. The bearing pads 54 coact in sliding engagement with the slide rails 48 which are anchored to the front surface of the intermediate plate 44. Thus, it can be observed that the vertical slide assembly 50 can move in a vertical direction that is perpendicular to the horizontal movement of the transfer platform 30 and the horizontal slide assembly 42.

The forward plate 52, which faces the vehicle assembly line, has mounted thereon a probe 56 for interaction with a target 58 that is affixed to or forms an integral part of a vehicle frame on the vehicle assembly line. The target 58 is represented by dotted lines as depicted in FIG. 1. While the probe 56 is shown in FIG. 1 as a single entity, it could be represented by two or more separate probes or indicators for interaction with a plurality of targets or locations on the vehicle body. The forward plate 52, in addition to the probe 56, also has attached thereto one or more fluid driven tools 60 that can advance in a direction toward the vehicle frame.

The tool 60 is composed of a fluid driven actuator 62 that has a fluid or electrically driven motor attached to an actuator rod that is a part of the actuator 62. The fluid driven actuator 62 is caused to extend its actuator rod by the introduction of a fluid to an orifice 64. The actuator rod of the fluid driven actuator 62 is retracted by the introduction of a fluid to an orifice 66. A fluid or electrically driven motor 68 is attached to the forward end of the actuator rod previously mentioned. The motor 68, which is powered through an electrical line 70, causes a drill bit 72 to perform useful work on a vehicle body on an adjacent assembly line.

The present inventive concept also includes the utilization of a socket base 61 that is attached to the forward plate 52. The socket base 61 has a recess 63 that will accommodate a protruding portion of a separate tool assembly (not shown) that can be indexed with the recess 63. The separate tool assembly can then perform useful work on the vehicle body at a precise location that has been predetermined by the overall apparatus 12 of the present invention and the accompanying probe 56.

Figure 2:
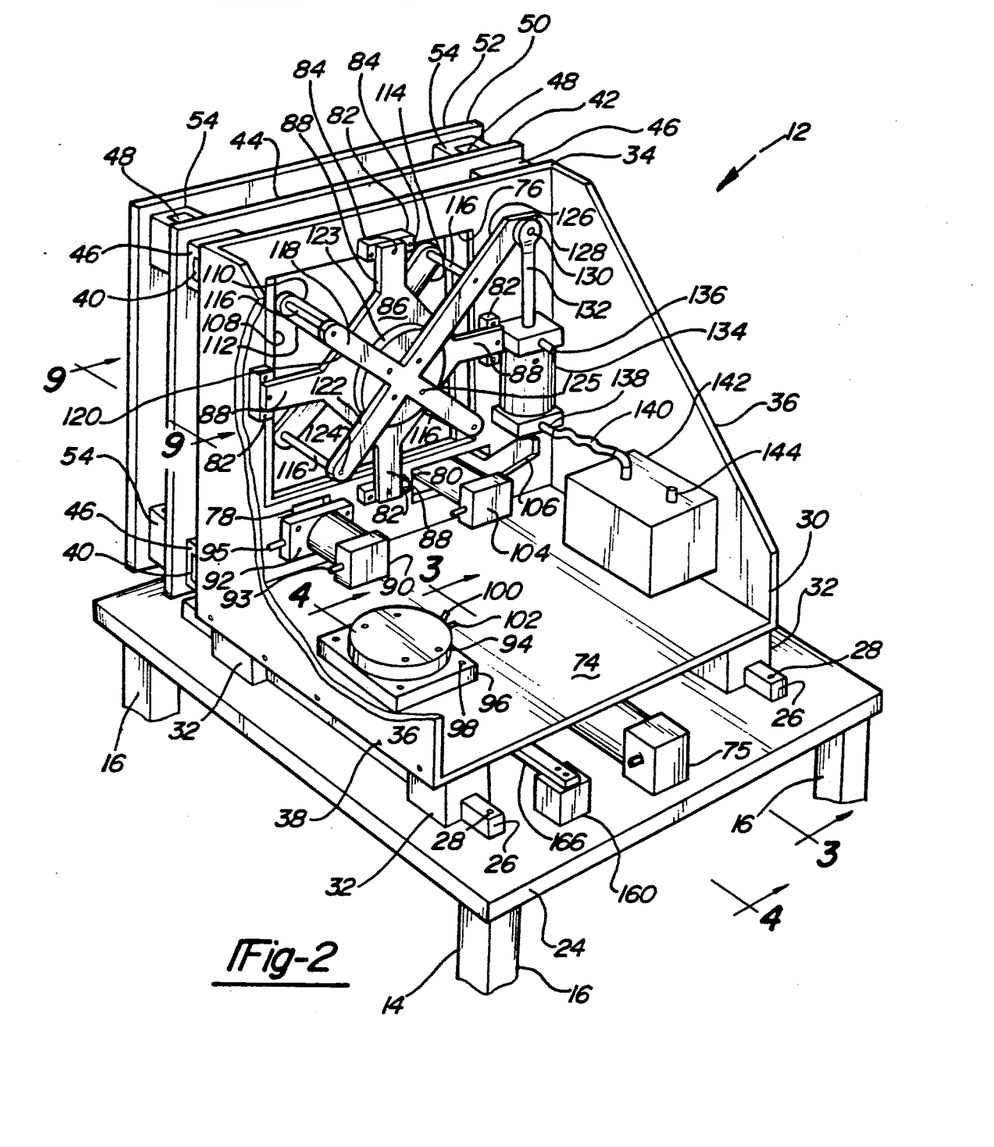
FIG. 2 is a rear perspective view that shows in detail the majority of the components of the present apparatus.

FIG. 2 is a part sectioned perspective rear view of the present invention which shows a majority of the working components of the present invention. The transfer platform 30 has a floor or base plate 74 to which the previously mentioned bearing pads 32 are fastened. The entire transfer platform 30 moves along the slide rails 26 toward and away from a vehicle assembly line that is adjacent the front end of the overall apparatus 12. A fluid driven actuator 75 is positioned below the base plate 74 and is attached to the top plate 24. The fluid driven actuator 75 is responsible for a major portion of the linear motion of the transfer platform 30 as will be more fully explained hereinafter. The support plate 34, which is mounted in an upright position at the forward edge of the base plate 74, contains a large rectangularly configured aperture or window 76 and two smaller apertures or openings 78 and 80. A plurality of support blocks 82 are attached to the rear surface of the support plate 34 adjacent to each side of the window 76. The support blocks 82 are immobilized by bolts 84 that are tapped into the support plate 34. One pair of the support blocks 82 is in vertical alignment and the other pair of the support blocks is in horizontal alignment. A clamp plate 86 has four cantilevered legs 88, each of which are attached to the support blocks 82. Thus, the clamp plate 86 is firmly attached to the support plate 34 and in parallel alignment therewith. The purpose and function of the clamp plate 86 will be set forth in greater detail later. The opening 78 in the support plate 34 provides access for a portion of a fluid actuator 90. The fluid actuator 90 bridges the opening 78 and is attached to the rear surface of the support plate 34 by bolts 92. A fluid line 93 for the extension of the fluid actuator rod within the fluid actuator 90 and a fluid line 95 for the withdrawal of the actuator rod are provided for in the structure of the fluid actuator 90.

A fluid driven actuator 94 is attached by means of a flange 96 and accompanying bolts 98 to the top surface of the base plate 74. The actuator rod of the actuator 94 extends through an orifice in the base plate 74. The actuator 94 is controlled by ingress and egress fluid lines 100 and 102. The overall purpose and function of the actuator 94 will become more clear during a later discussion.

The intermediate plate 44, which is a component of the horizontal slide assembly 42, is positioned forward of the support plate 34 and is adapted for horizontal movement perpendicular to the horizontal movement of the transfer platform 30. The opening 80 in the support plate 34 is extra wide to provide adequate clearance for a fluid actuator 104 and a weight compensation support arm 106 which pass through the opening 80. Both the actuator 104 and the support arm 106 are fastened to the intermediate plate 44. Thus, the intermediate plate 44 can move horizontally without the actuator 104 and the support arm 106 actually contacting the vertical sides of the opening 80. The intermediate plate 44 has a large aperture or window 108 located in the central portion thereof. The purpose of the window 108 will be explained immediately below.

The vertical slide assembly 50 is positioned forward of the horizontal slide assembly 42. The forward plate 52 of the vertical slide assembly 50 has a rigid reinforcing structure 110 firmly anchored to its central region.

The reinforcing structure 110 is formed from two dovetailed bar members 112 and 114 which are attached to each other in the form of a cross. A connecting strut 116 is attached near the end of each arm of the bar members 112 and 114. The connecting struts 116 extend perpendicular to the axial extent of the bar members 112 and 114.

Also, the connecting struts 116 pass through the windows 76 and 108 of the respective plates 34 and 44. The connecting struts 116 are attached to a second dovetailed cross-like reinforcing structure 118 which is formed from a bar 120 and bar 122. The connecting struts 116 are anchored to the bars 120 and 122 by bolts 124. The bar 122 has one elongated arm 126 thereof longer than the remainder of the arms on the bars 120 and 122. An end 128 of the elongated arm 126 is coupled to a clevis 130 that is attached to an actuator rod 132 of a fluid actuator 134. The actuator 134 is supported in an upright attitude by an attachment to an end of the support arm 106. The actuator 134 is preferably driven by a fluid, such as air. The actuator 134 has a fluid inlet 136 which permits ingress and egress of a fluid as required. The actuator also has a lower fluid inlet 138 that is coupled, via a flexible tube 140, to a surge tank 142. The surge tank 142 is anchored to the base plate 74 and has a fluid inlet and check valve 144 that is easily accessible. A fluid driven actuator 123 is mounted at and against the intersection of the bars 120 and 122 by bolts 125. The purpose of the surge tank 142 and the fluid driven actuator 123 will be explained hereinafter.

Figure 3:
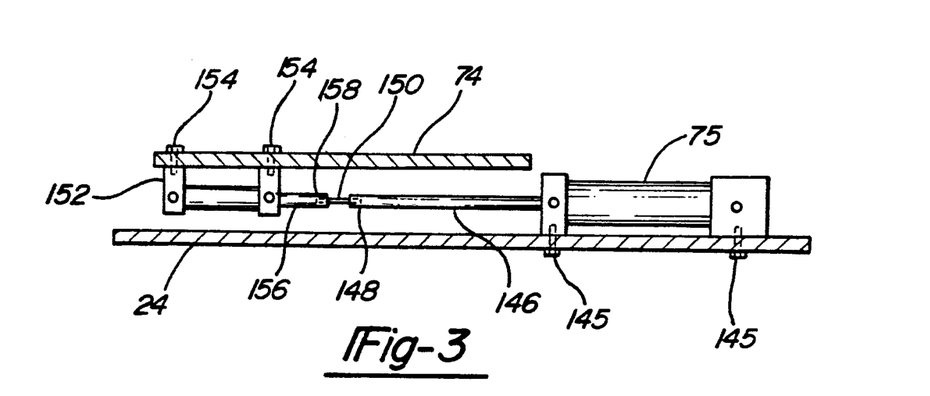
FIG. 3 is a part sectioned elevational side view taken along lines 3—3 of FIG. 2 that shows the "in tandem" actuators that control the movement of the transfer platform.

FIG. 3 is an elevational view, partly in section, taken along lines 3—3 of FIG. 2 which shows the power source for movement of the transfer platform 30. The actuator 75 is anchored to the top surface of the top plate 24 by bolts 145. An actuator arm 146 of the actuator 75 extends in the direction of travel of the transfer platform 30. An end 148 of the actuator arm 146 contains a threaded bore for reception of a coupling rod 150 which is threaded on both of its ends. A smaller fluid actuator 152 is attached to the bottom surface of the base plate 74 by fasteners such as bolts 154. The smaller fluid actuator 152 has an actuator arm 156 that contains a threaded bore in its end 158. The coupling rod 150 is also threaded into the threaded bore in the end 158 of the actuator arm 156. Thus, the fluid actuators 75 and 152 are in axial alignment with one another with the ends 148 and 158 of the respective actuator arms 146 and 156 also in axial alignment. The above set forth coupling of the actuators 75 and 152 permits the actuator 75 to control the rapid movement of the transfer platform 30 while the smaller actuator 152 is utilized to control minor adjustments of the position of the transfer platform 30.

Figure 4:
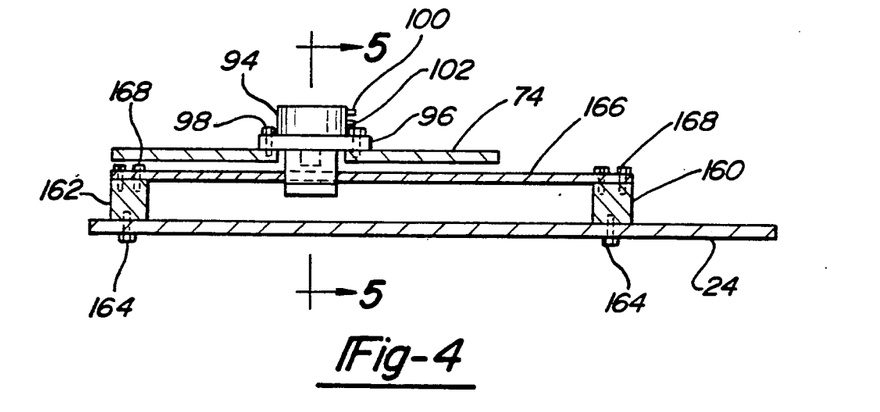
FIG. 4 is a part sectioned elevational side view taken along lines 4—4 of FIG. 2 that shows the immobilization structure for the transfer platform.

FIG. 4 is an elevational view partly in section, taken along lines 4—4 of FIG. 2 which shows the clamping technique employed to immobilize the position of the transfer platform 30. A pair of support blocks 160 and 162 is secured to the top surface of the top plate 24 by fasteners, such as bolts 164. The support blocks 160 and 162 are aligned with the direction of travel of the transfer platform 30. A clamp bar 166 is attached to and suspended horizontally between the support blocks 160 and 162. The clamp bar 166 is attached to the top surface of the support blocks 160 and 162 by bolts 168.

Figure 5:
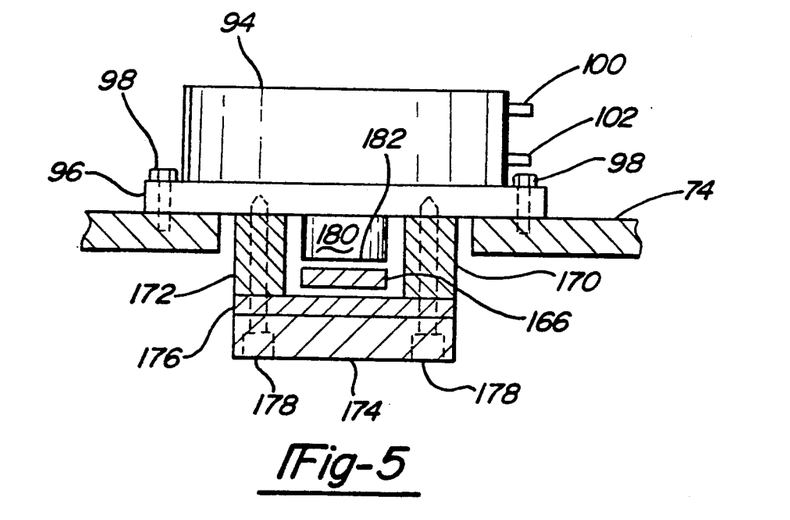
FIG. 5 is a cross-sectional view taken along lines 5—5 of FIG. 4 that shows the clearances associated with the immobilization structure.

FIG. 5 is a part sectioned elevational view taken along lines 5—5 of FIG. 4 which shows the intercoupling of the fluid actuator 94 and the clamp bar 166. Two posts 170 and 172 are attached to the bottom surface of the actuator attachment flange 96. The posts 170 and 172 are in spaced apart relationship with respect to each other so that they can straddle the clamp bar 166 without interfering therewith. A cross bar 174 and a clamp pad 176 span the distance between the posts 170 and 172. The clamp pad 176, the cross bar 174, and the posts 170 and 172 are held firmly in position by bolts 178 that pass therethrough and are threaded into the flange 96 of the actuator 94. An actuator rod 180 of the actuator 94 has by its geometry a very short stroke, therefore, its end 182 is positioned in close proximity to the top surface of the clamp bar 166. The space between the end 182 of the actuator rod 180 and the top surface of the clamp bar 166 is in the magnitude of 0.005 inch. Also the clearance between the bottom surface of the clamp bar 166 and the clamp pad 176 is approximately 0.005 inch. During the selection of material for the clamp bar 166 it is desirable to select a material with a relatively low Young's modulus such as, for example, aluminum. Not only is aluminum desirable from a deflection standpoint, it is also desirable because of the high coefficient of friction that can be developed, particularly when an aluminum clamp bar 166 coacts with an aluminum clamp pad 176. It is to be understood that while aluminum is the material of choice for the clamp bar and clamp pad 166 and 176, other materials would enable the overall apparatus 12 to function in an acceptable manner. While it has not been illustrated in the drawings, additional friction can be developed by the attachment of an aluminum pad to the end 182 of the actuator rod 180.

Figure 6:
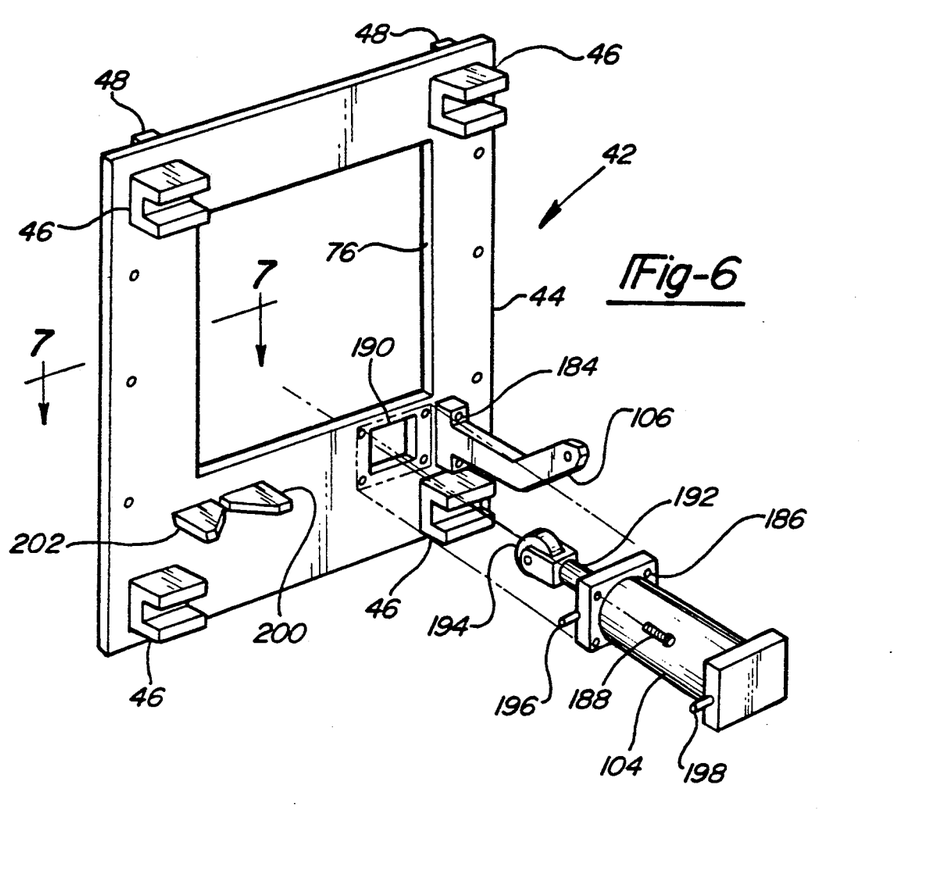
FIG. 6 is a rear perspective view of the horizontal slide assembly and the components attached thereto.

FIG. 6 is a perspective view, from the rear, of the horizontal slide assembly 42 and the components attached thereto. The intermediate plate 44 is shown in perspective with its large window 76 positioned near the central region thereof. The bearing pads 46 are positioned in axially aligned pairs near the top and bottom edges of the intermediate plate 44. The bearing pads interact with the horizontally aligned slide rails 40 that are anchored to the front face of the support plate 34, as depicted in FIGS. 1 and 2. The support arm 106 which is attachable to the lower end of the fluid actuator 134, as shown in FIG. 2, is attached to the rear surface of the intermediate plate 44 by bolts 184. Thus, it can be seen that the support arm 106 is cantilevered in rigid fashion from the intermediate plate 44. The support arm 106 passes through the opening 80 in the support plate 34 without interference therewith. The opening 80 in the support plate 34, as shown in FIG. 2, has sufficient width so that the support arm 106 can move horizontally along with the intermediate plate 44 without interfering with the edges of the opening 80 in the support plate 34. The actuator 104 is positioned adjacent to the support arm 106 and its flange 186 is firmly attached to the intermediate plate 44 by bolts 188. The actuator 104 which is cantilevered from the surface of the intermediate plate 44, also protrudes through the opening 80 in the support plate 34. The opening 80 is of sufficient width to also accommodate the actuator 104 without interference occurring when the horizontal slide assembly 42 traverses its horizontal extent. The actuator 104 is controlled by a fluid inlet 196 and outlet 198. An aperture 190 is positioned in the intermediate plate 44. The aperture 190 is in axial alignment with the longitudinal axis of the actuator 104. The aperture 190 is of sufficient size so as to permit an actuator rod 192 and a clevised cam roller 194 to pass freely therethrough. The interactive structure associated with the clevised cam roller 194 is shown in a subsequent view. A pair of opposed cam blocks 200 and 202 is attached to the surface of the intermediate plate 44. The cam blocks 200 and 202 are aligned in a horizontal direction and the including angle between the cam surfaces is approximately 120° degrees. The function and interaction with the cam blocks 200 and 202 are discussed hereinafter.

Figure 7:
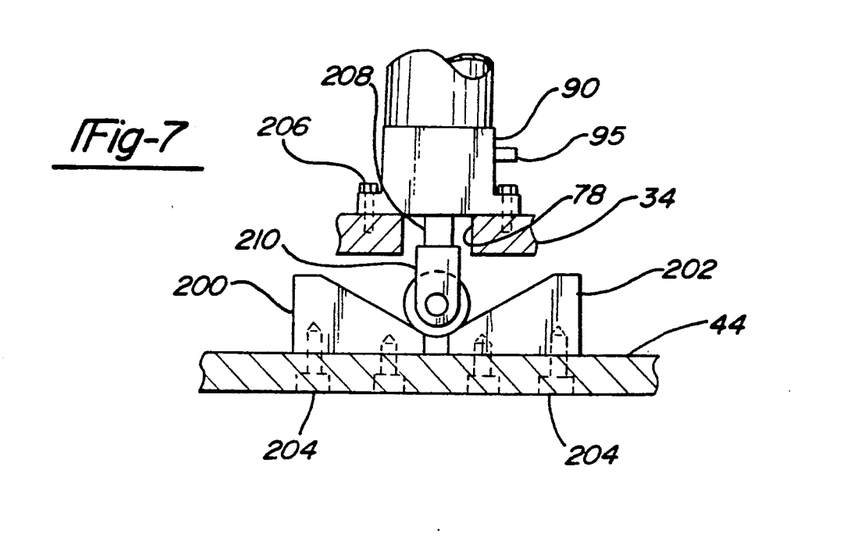
FIG. 7 is a part sectioned plan view taken along section lines 7—7 of FIG. 6 which shows a centering mechanism associated with the horizontal slide assembly.

FIG. 7 is a part sectioned plan view, taken along section lines 7—7 of FIG. 6, which shows the centering mechanism associated with the horizontal slide assembly 42. The intermediate plate 44 is shown with the cam blocks 200 and 202 attached thereto by bolts 204. The fluid actuator 90, which is also shown in FIG. 2, is attached rigidly to the rear surface of the support plate 34 by bolts 206. An actuator rod 208 and a clevised cam roller 210 are positioned through the opening 78 in the support plate 34. As the intermediate plate 44 moves horizontally, the actuator rod 208 will be forced within the actuator 90 as the cam roller 210 advances along the inclined cam surface of either the cam block 200 or the cam block 202. When it is desired to return the horizontal slide assembly 42 to its original neutral zero position, the actuator rod 208 of the actuator 90 is extended, causing the cam roller 210 to exert a horizontal force on the intermediate plate 44 to return the horizontal slide assembly 42 to its zero position.

Figure 8:
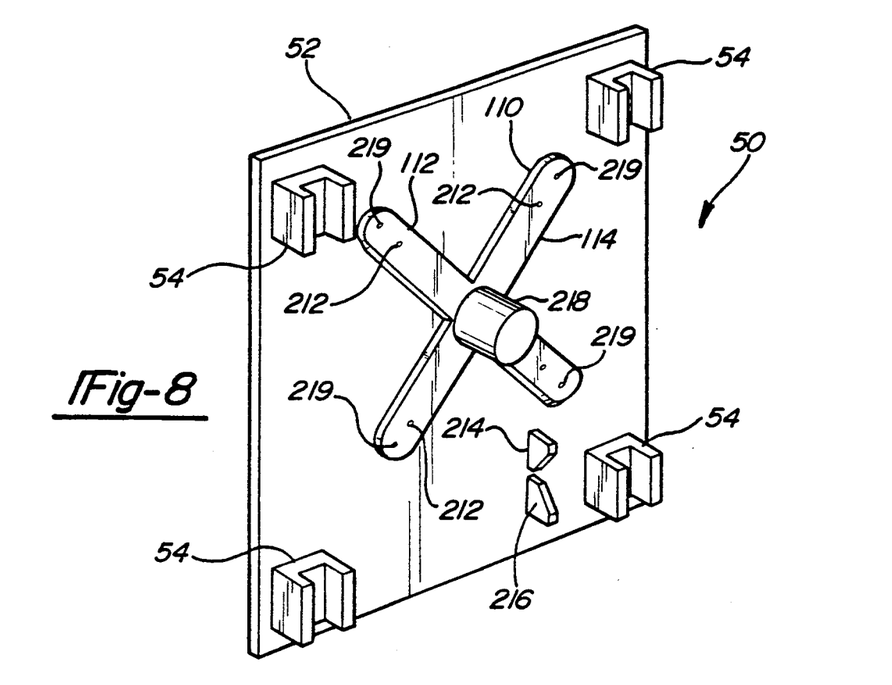
FIG. 8 is a rear perspective view of the vertical slide assembly and the components attached thereto.

FIG. 8 is a rear perspective view of the vertical slide assembly 50 and the components attached thereto. The forward plate 52 is shown in perspective with the bar members 112 and 114 attached thereto by bolts 212. A pair of cam blocks 214 and 216 is attached, in vertical alignment, to a surface of the forward plate 52 by fasteners (not shown). The cam blocks 214 and 216 are positioned in horizontal alignment with the aperture 190 in the intermediate plate 44. Thus, as the clevised cam roller 194 of the fluid actuator 104, as depicted in FIG. 6, protrudes through the aperture 190, the clevised cam roller 194 will interact with the cam surfaces of the cam blocks 214 and 216. The interaction of the clevised cam roller is identical to the mechanism shown and described in association with previously discussed FIG. 7. Thus, when the vertical slide assembly 50 has moved from its neutral or zero position it can be returned to the zero position by extension of the actuator rod 192 which causes the clevised cam roller 194 to seek the center of the cam surfaces associated with the cam blocks 214 and 216. As previously pointed out, the bar members 112 and 114 provide rigidity to the forward plate 52. A clamp anvil 218 is attached to the bar members 112 and 114 at the intersection thereof. The clamp anvil 218 is attached in cantilevered fashion by fasteners (not shown). The purpose and function of the clamp anvil is discussed later herein.

The bar members 112 and 114 also serve as the mounting structure for the connecting struts 116 that are shown in FIG. 2. The connecting struts 116 are attached to the bar members 112 and 114 at the attachment point identified by the numeral 219. The assembly of the bar members 112 and 114, the connecting struts 116, and the bars 120 and 122 form a cage-like assembly that has the freedom of horizontal and vertical movement within the windows 76 and 108 of the support plate 34 and the intermediate plate 44. Since the elongated arm 126, which is an extension of the bar 122, as shown in FIG. 2, is quite rigidly supported, an upward force when applied to the end 128 of the elongated arm will cause the vertical slide assembly 50 to move in a vertical direction. During use of the overall apparatus 12, an upward biasing force is applied to the end 128 of the elongated arm 126 by means of the fluid actuator 134. The upward biasing force afforded by the actuator 134 is equal to the weight of the vertical slide assembly 50. An equilibrium between the weight of the vertical slide assembly 50 and the force of the actuator 134 is maintained by a predetermined amount of fluid pressure applied to the surge tank 142 through the check valve 144. Thus, the surge tank 142 and the actuator 134 act as a spring to compensate for the weight of the vertical slide assembly 50.

Figure 9:
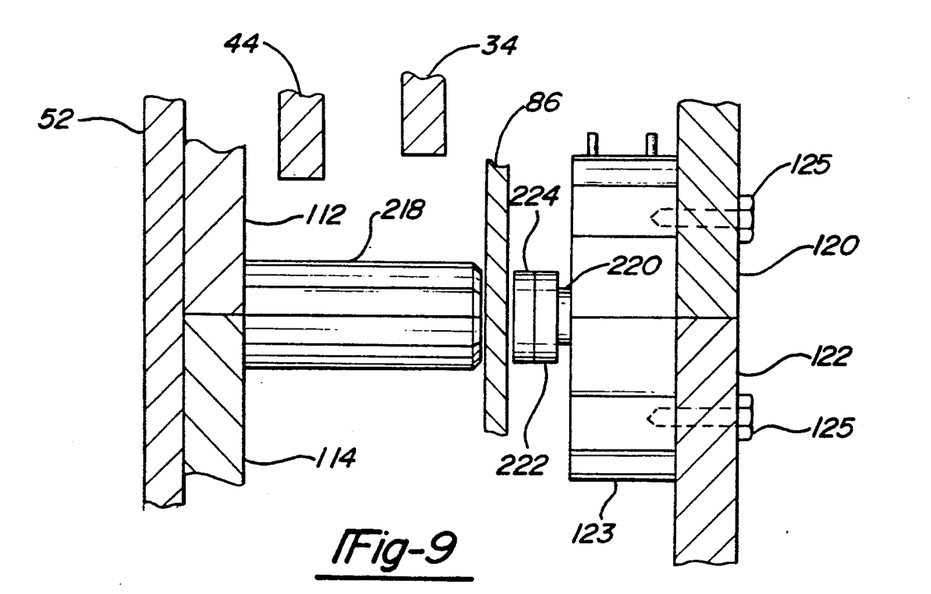
FIG. 9 is a part sectioned fragmentary side view taken in the direction of lines 9—9 of FIG. 2 that shows the immobilization arrangement for the horizontal slide assembly and the vertical slide assembly.

FIG. 9 is a part sectioned fragmentary side view taken along lines 9—9 of FIG. 2 that depicts the immobilization arrangement for the horizontal slide assembly 42 and the vertical slide assembly 50. The forward plate 52 is shown at the left-hand side of FIG. 9. The bar members 112 and 114 are rigidly attached to the forward plate. The clamp anvil 218 is rigidly attached to the bar members 112 and 114 at their intersection. The clamp anvil 218 is cantilevered toward the rear of the overall apparatus 12 and is terminated just short of the clamp plate 86. The clamp anvil 218 is in axial alignment with the axis of the actuator 123 which is attached to the bars 120 and 122 at the intersection thereof by the bolts 125. An actuator rod 220 extends from the actuator 123 toward the clamp plate 86. The actuator rod 220 is equipped with an end flange 222 to which a clamp pad 224 is attached.

In the unclamped position, as shown in FIG. 9, there is a clearance gap of approximately 0.005 inch between the end of the clamp anvil 218 and the clamp plate 86.

Also, there is a clearance gap of approximately 0.005 inch between the clamp pad 224 and the clamp plate 86. Thus, the anvil 218 and the clamp pad 224 can move in unison vertically and horizontally over the surfaces of the clamp plate 86.

ASSEMBLY AND OPERATION

The assembly of the overall apparatus 12 of the present invention is very straightforward. The base structure 14 is assembled by known techniques, such as bolting or welding. The fluid actuator 75 is affixed to the top surface of the top plate 24. The support blocks 160 and 162 are fastened to the top plate 24 and the clamp bar 166 is attached to the top of the support blocks 160 and 162. The slide rails 26 are anchored to the top surface of the top plate 24 by the bolts 28. The fluid actuator 152 is coupled to the actuator 75 by installation of the coupling rod 150. The bearing pads 32 are then positioned on the slide rails 26. The base plate 74 is then affixed to the bearing pads 32 and the actuator 94 is attached to the base plate 74 in alignment with the clamp bar 166. The fluid actuator 152 is also attached to the underside of the base plate 74. The support plate 34 and the side plates 36 are then bolted to the base plate 74. The support blocks 82 and the clamp plate 86 are secured to the support plate 34 and the actuator 90 is then bolted to the support plate 34. The slide rails 40 and accompanying bearing pads 46 are attached to the front face of the support plate 34. The support arm 106 and the adjacent actuator 104 are bolted to the rear face of the intermediate plate 44. Also, the cam blocks 200 and 202 are attached to the intermediate plate 44. The intermediate plate 44 is then affixed to the bearing pads 46, thus, the horizontal slide assembly 42 is in position for horizontal movement. The slide rails 48 and coacting bearing pads 54 are attached to the front of the intermediate plate 44. The bar members 112 and 114 are fitted together in dovetail fashion and the connecting struts 116 and the clamp anvil 218 are attached to the bar members 112 and 114 to form a subassembly. The subassembly is then bolted to the rear face of the forward plate 52. The cam blocks 214 and 216 are attached to the forward plate 52. The forward plate 52 is then fastened to the bearing pads 54, thus, forming the vertical slide assembly 50. The bars 120 and 122 are dovetailed together and attached to the ends of the connecting struts 116. The actuator 134 is then attached to the end 128 of the bar 122 and the cantilevered end of the support arm 106. The surge tank 142 is then attached to the base plate 74 and the flexible tube 140 is connected to the actuator 134. The tool and socket base complement 60 and 61 and the probe 56 are attached to the front face of the forward plate 52. The necessary fluid tubes, switching valves, and electrical coupling is then accomplished and the assembly is complete.

During the operation of the overall apparatus 12, the electrical system is energized by pressing an on switch 226 that is positioned on a control console 228. The fluid system is also actuated and controlled by a series of switches 230 that cause a fluid medium such as air or oil to flow into or out of the selected fluid actuators. In a fully automated work environment, the control devices for the overall apparatus 12 are located remote from the overall apparatus 12 and function in an automatic manner with little or no input from an operator. The advancement of the transfer platform 30 toward the assembly line is accomplished by extending the actuator arm 146 of the actuator 75. The rapid movement of the transfer platform 30 is accomplished by the actuator 75. As the transfer platform 30 approaches the target 58, a slower and more precise movement is attained by actuating the actuator 152 as best viewed in FIG. 3. As the probe seeks its final position within the confinement of the target, the horizontal slide assembly 42 will move either right or left under the lateral forces delivered to the probe 56 by the target 58. Likewise, the vertical slide assembly 50 will move up or down depending upon the position of the target 58. As the probe 56 reaches a centered final position within the target 58, the movement of the transfer platform 30 is immobilized by extending the actuator rod 180 of the actuator 94. The end 182 of the actuator rod 180 clamps the clamp bar 166 firmly against the clamp pad 176 as can be seen in FIG. 5. Since the clamp bar 166 can flex quite freely, little force is required to immobilize the entire transfer platform 30 with respect to the top plate 24 and the attached base structure 14.

Referring to FIG. 2, it can be seen that the clamp plate 86 does not move in a lateral or vertical direction since the clamp plate 86 is attached to the support plate 34. The cage-like structure, formed by the bar members 112, 114, 120, 122 and the connecting struts 116, does move both laterally and vertically with respect to the clamp plate 86. Also, the actuator 123, which is attached to the bars 120 and 122, undergoes the same lateral and vertical movement as does the previously mentioned cage-like structure. Referring to FIG. 9, the clamp anvil 218 moves laterally and vertically in unison with the actuator 123. As the probe 56 reaches its final position, the actuator rod 220 of the actuator 123 is extended, clamping the clamp plate 86 firmly between the clamp anvil and the clamp pad 224. The clamp plate 86, which is preferably made of a low modulus material such as aluminum, can flex quite readily assuring an instantaneous clamping effect.

After the probe 56 has reached its final location with respect to the target 58, and the overall assembly 12 has been immobilized by energizing the actuators 94 and 123, the tool 60 is in a position to drill a hole in the vehicle frame that is accurately positioned with respect to the target. In order to accomplish the drilling on the vehicle frame on the assembly line, the actuator rod of the actuator 62 is advanced causing the motor 68 to also advance to complete the drilling function. Upon completion of the drilling, the clamping action of the actuator 94 on the clamp bar 166 is released, the drill motor 68 is withdrawn from the vehicle frame and the transfer platform 30 is moved rapidly away from the assembly line under the retraction influence of the actuator 75. The actuator 152 is repositioned to a neutral position in readjustment for the next cycle. When the socket base 61 and its recess 63 are utilized, the overall apparatus 12 is immobilized subsequent to the seating of the probe 56. A separate tool carrying assembly is then engaged within the recess 63 and the separate tool carrying assembly then performs work on the vehicle body. After the separate tool carrying assembly has completed its work functions, it is disengaged from the recess 63. The overall apparatus 12 is then moved to a neutral position to await the next vehicle body or frame.

In order to ready the overall apparatus 12 for the next vehicle frame on the assembly line, the probe is repositioned to a neutral position. The repositioning is accomplished by releasing the clamping force of the actuator 123 on the clamp plate 86 and extending the clevised cam roller 194 of the actuators 90 and 104. The extension of the clevised cam rollers 194 interact with the surfaces of the cam blocks 200, 202, 214 and 216, thus returning the horizontal slide assembly 42 and the vertical slide assembly 50 to a neutral position.

While the illustrative embodiments of the invention have been described in considerable detail for the purpose of setting forth practical operative structures whereby the invention may be practiced, it is to be understood that the particular apparatus described is intended to be illustrative only, and that the various novel characteristics of the invention may be incorporated in other structural forms without departing from the spirit and scope of the invention defined in the appended claims.

What is claimed is:

1. An apparatus for locating and assuming a position with respect to an object that is located adjacent to said apparatus, said apparatus comprising:
   a base structure having support means oriented in a generally horizontal attitude;
   a transfer platform having structural members attached thereto, said transfer platform being positioned on said base structure in spaced apart relationship with respect to said support means;
   means coupled between said transfer platform and said support means to cause relative motion therebetween in a first direction;
   a resilient member secured to said support means;
   immobilizing means secured to said transfer platform, said immobilizing means being engagable with said resilient member so as to immobilize the position of said transfer platform with respect to said support means;
   a first slide assembly attached to and positioned in juxtaposed relationship with respect to one of said structural members of said transfer platform for movement in a second direction that is perpendicular to said first direction;

a second slide assembly attached to and positioned adjacent to said first slide assembly for movement in a third direction that is perpendicular to said first and second directions;

at least one probe attached to said second slide assembly for moving said second slide assembly and said first slide assembly to a first predetermined position, said first predetermined position being dictated by an externally positioned target; and means coupled between said second slide assembly and said transfer platform for immobilizing the movement of said second and first slide assemblies with respect to said transfer platform.

2. An apparatus as set forth in claim 1 further comprising tool means attached to said second slide assembly.

3. An apparatus as set forth in claim 2 wherein advancement means is interposed between said tool means and said second slide assembly.

4. An apparatus as set forth in claim 3 wherein said advancement means is a fluid driven actuator and said tool means is at least one drill.

5. An apparatus as set forth in claim 1 wherein said means to cause relative motion between said transfer platform and said support means is at least one fluid driven actuator.

6. An apparatus as set forth in claim 5 wherein said means to cause relative motion is comprised of two fluid driven actuators having actuator rods coupled in tandem.

7. An apparatus as set forth in claim 1 wherein said immobilizing means to immobilize the position of said transfer platform with respect to said support means further comprises a fluid driven actuator attached to said transfer platform and wherein said resilient member is a clamp bar attached to said support means.

8. An apparatus as set forth in claim 7 wherein said clamp bar has a Young's modulus less than steel.

9. An apparatus as set forth in claim 8 wherein said clamp bar is made of aluminum.

10. An apparatus as set forth in claim 1 further comprising centering means positioned between said first slide assembly and said transfer platform for returning said first slide assembly to a neutral position.

11. An apparatus as set forth in claim 10 wherein said centering means comprises a fluid actuator attached to said transfer platform and cam blocks having cam surfaces attached to said first slide assembly.

12. An apparatus as set forth in claim 11 further comprising a cam follower advanced by said fluid actuator, said cam follower interacting with said cam surfaces.

13. An apparatus as set forth in claim 1 further comprising centering means positioned between said second slide assembly and said first slide assembly for returning said second slide assembly to a neutral position.

14. An apparatus as set forth in claim 13 wherein said centering means comprises a fluid actuator attached to said first slide assembly and cam blocks having cam surfaces attached to said second slide assembly.

15. An apparatus as set forth in claim 14 further comprising a cam follower advanced by said fluid actuator, said cam follower interacting with said cam surfaces.

16. An apparatus as set forth in claim 1 further comprising weight compensation means interposed said second slide assembly and said first slide assembly to offset the weight of said second slide assembly.

17. An apparatus as set forth in claim 16 wherein said weight compensation means is a fluid driven actuator.

18. An apparatus for locating and assuming a position with respect to an object that is located adjacent to said apparatus, said apparatus comprising:

a base structure having a planar top plate oriented in a generally horizontal attitude and at least one upright leg support attached to said planar top plate;

a transfer platform having an upright support plate and side plates attached thereto, said transfer platform being coupled to and positioned above in spaced apart relationship with respect to said planar top plate of said base structure;

a first pair of slide rails and accompanying bearing pads positioned between said transfer platform and said planar top plate;

means coupled between said transfer platform and said planar top plate to cause relative motion therebetween along said pair of slide rails in a first horizontal direction;

a resilient member secured to said support means;

immobilizing means secured to said transfer platform, said immobilizing means being engagable with said resilient member so as to immobilize the position of said transfer platform with respect to said planar top plate;

a first slide assembly attached to and positioned in juxtaposed relationship with respect to said support plate of said transfer platform for movement in a second horizontal direction that is perpendicular to said first horizontal direction;

a second pair of slide rails and accompanying bearing pads positioned between said support plate and said first slide assembly;

a second slide assembly attached to and positioned adjacent to said first slide assembly for movement in a vertical direction that is perpendicular to said first and second horizontal directions;

a third pair of slide rails and accompanying bearing pads positioned between said first slide assembly and said second slide assembly;

means coupled between said second slide assembly and said transfer platform for simultaneously immobilizing the movement of said second and first slide assemblies with respect to said transfer platform;

probe means attached to said second slide assembly for moving said second slide assembly and said first slide assembly to a first predetermined position, said first predetermined position being dictated by an externally positioned target; and work performing means attached to said second slide assembly for advancement toward and away from a workpiece positioned adjacent said apparatus.

19. An apparatus as set forth in claim 18 wherein said work performing means comprises at least one tool.

20. An apparatus as set forth in claim 19 further comprising a fluid actuator used to advance said at least one tool toward said workpiece.

21. An apparatus as set forth in claim 18 wherein said means for causing relative motion comprises a first fluid driven actuator attached to said transfer platform and a second fluid driven actuator attached to said planar top plate, said first and second fluid driven actuators further each having an actuator rod, said actuator rods of said first and second actuators being coupled in tandem.

22. An apparatus as set forth in claim 18 wherein said immobilizing means is a fluid driven actuator attached to said transfer platform and wherein said resilient member is an elongated free standing clamp bar attached at both ends for support on said planar top plate.

23. An apparatus as set forth in claim 22 wherein said elongated free-standing clamp bar has a Young's modulus less than steel.

24. An apparatus as set forth in claim 23 wherein said elongated free-standing clamp bar is made of aluminum.

25. An apparatus as set forth in claim 18 further comprising centering means positioned between said first slide assembly and said transfer platform for returning said first slide assembly to a neutral position.

26. An apparatus as set forth in claim 25 wherein said centering means is a fluid actuator attached to said transfer platform and cam blocks having cam surfaces attached to said first slide assembly.

27. An apparatus as set forth in claim 26 further comprising a cam follower advanced by said fluid actuator, said cam follower interacting with said cam surfaces.

28. An apparatus as set forth in claim 18 further comprising centering means positioned between said second slide assembly and said first slide assembly for returning said second slide assembly to a neutral position.

29. An apparatus as set forth in claim 28 wherein said centering means comprises a fluid actuator attached to said first slide assembly and cam blocks having cam surfaces attached to said second slide assembly.

30. An apparatus as set forth in claim 29 further comprising a cam follower advanced by said fluid actuator, said cam follower interacting with said cam surfaces.

31. An apparatus as set forth in claim 18 further comprising weight compensation means interposed said second slide assembly and said first slide assembly to offset the weight of said second slide assembly.

32. An apparatus as set forth in claim 31 wherein said weight compensation means is a fluid driven actuator.

33. An apparatus as set forth in claim 32 wherein said fluid driven actuator further comprises at least one fluid inlet connected to a pressurized surge tank.

34. An apparatus as set forth in claim 18 further comprising:
    at least one aperture in said first slide assembly; and
    at least one aperture in said upright support plate whereby said means for immobilizing said first and second slide assemblies extend through said at least one aperture in said first slide assembly and in said support plate.

35. An apparatus as set forth in claim 34 wherein said means for immobilizing further comprises a single clamp plate attached to said upright support plate, said clamp plate forming a clamping surface for said means for immobilizing.

36. An apparatus as set forth in claim 35 wherein said clamp plate has a Young's modulus less than steel.

37. An apparatus as set forth in claim 36 wherein said clamp plate is made of aluminum.

38. An apparatus for locating and assuming a position with respect to a vehicle component that is located on an assembly line adjacent to said apparatus, said apparatus comprising:
    a base structure having a planar top plate oriented in a generally horizontal attitude and at least one upright leg support attached to said planar top plate;
    a transfer platform comprising a base plate having an upright support plate and side plates attached thereto, said support plate containing at least one aperture therethrough, said base plate being coupled to and positioned above in spaced apart relationship with respect to said planar top plate of said base structure;
    a pair of slide rails and accompanying bearing pads positioned between said base plate of said transfer platform and said planar top plate of said base structure, said first pair of slide rails being attached to said planar top plate;
    at least one first fluid actuator coupled between said base plate and said planar top plate to cause relative motion therebetween along said pair of slide rails in a first direction;
    a clamp bar attached in spaced relationship to said planar top plate; a second fluid actuator having a coupling clamp pad attached to said base plate, said second actuator being coupled with said clamp bar for immobilizing the position of said transfer platform with respect to said planar top plate;
    a first slide assembly comprising an intermediate plate oriented generally parallel to said support plate for movement in a second horizontal direction that is perpendicular to said first horizontal direction, said intermediate plate having at least one aperture therein;
    a first pair of slide rails and accompanying bearing pads positioned between said support plate and said intermediate plate, said first pair of slide rails being attached to said support plate;
    a second slide assembly comprising a forward plate oriented generally parallel to said intermediate and support plates for movement in a vertical direction that is perpendicular to said first and second horizontal directions;
    a second pair of slide rails and accompanying bearing pads positioned between said intermediate plate and said forward plate, said second pair of slide rails being attached to said intermediate plate;
    a clamp plate attached to said support plate, said clamp plate spanning said at least one aperture in said support plate;
    a first pair of support bars attached to said forward plate; a clamp anvil and connecting struts having one end attached to said first pair of support bars, said clamp anvil and connecting struts being aligned in a horizontal direction and passing through said at least one aperture in said intermediate and support plates; a second pair of support bars being attached to the other end of said connecting struts; a fluid actuator having a clamp pad attached to said second pair of support bars, said fluid actuator being in axial alignment with said clamp anvil, said clamp plate being positioned between said clamp anvil and said fluid actuator;
    at least one probe attached to said forward plate of said second slide assembly for moving said second and first slide assemblies to a position dictated by an externally positioned target; and
    at least one tool or tool receiving recess attached to said forward plate for advancement toward and away from said vehicle component.

39. An apparatus as set forth in claim 38 further comprising centering means positioned between said intermediate plate of said first slide assembly and said support plate of said transfer platform for returning said first slide assembly to a neutral position.

40. An apparatus as set forth in claim 39 wherein said centering means comprises a fluid actuator attached to said support plate and cam blocks having cam surfaces attached to said intermediate plate.

41. An apparatus as set forth in claim 40 further comprising a cam follower advanced by said fluid actuator, said cam follower interacting with said cam surfaces.

42. An apparatus as set forth in claim 38 further comprising centering means positioned between said forward plate of said second slide assembly and said intermediate plate of said first slide assembly for returning said second slide assembly to a neutral position.

43. An apparatus as set forth in claim 42 wherein said centering means comprises a fluid actuator attached to said intermediate plate of said first slide assembly and cam blocks having cam surfaces attached to said forward plate of said second slide assembly.

44. An apparatus as set forth in claim 43 further comprising a cam follower advanced by said fluid actuator, said cam follower interacting with said cam surfaces.

45. An apparatus as set forth in claim 38 further comprising weight compensation means interposed said second pair of support bars and said intermediate plate to offset the weight of said second slide assembly.

46. An apparatus as set forth in claim 45 wherein said weight compensation means is a fluid actuator.

47. An apparatus as set forth in claim 38 wherein at least one fluid inlet of said at least one first fluid actuator is connected to a surge tank.

48. An apparatus as set forth in claim 38 wherein said clamp plate and clamp bar have a Young's modulus less than steel.

49. An apparatus as set forth in claim 48 wherein said clamp plate and clamp bar are made of aluminum.

50. An apparatus as set forth in claim 38 wherein said clamp pads reacting with said clamp plate and clamp bar are made of aluminum.

51. A method of fixing a position from input gained by contact with an object, then utilizing said position to perform work on said object, said method comprising the steps of:
    positioning said object in close proximity to a position detecting apparatus that has a base structure, a transfer platform, a slide assembly, and at least one probe;
    moving said transfer platform toward said object in a first direction;
    guiding said transfer platform in said first direction along a first linear guideway while maintaining a first slidable coupling having a first clamping means mounted to said transfer platform and circumscribing a longitudinally extending resilient member mounted to said base structure;
    contacting said object with said at least one probe while said transfer platform is being moved and guided in said first direction;
    moving said slide assembly of said position detecting apparatus in a second direction perpendicular to said first direction in response to said at least one probe contacting said object;
    guiding said slide assembly in said second direction along a second linear guideway while maintaining a second slidable coupling having a second clamping means adjacent a planar resilient member, said planar resilient member being supported adjacent said slide assembly by said transfer platform;
    moving said slide assembly of said position detecting apparatus in a third direction perpendicular to said first and second directions in response to said at least one probe contacting said object;
    guiding said slide assembly in said third direction along a third linear guideway while maintaining said second slidable coupling having said second clamping means adjacent said planar resilient member;
    immobilizing said position detecting apparatus to preserve its position as determined by said at least one probe, said immobilizing step further comprising the steps of:
        deflecting said longitudinally extending resilient member with said first clamping means to create frictional interference therebetween, said frictional interference immobilizing said transfer platform; and
        deflecting said planar resilient member with said second clamping means to create frictional interference therebetween, said frictional interference immobilizing said slide assembly; and
    performing work on said object relative to said position.

52. The method as claimed in Claim 51 wherein said steps of deflecting said longitudinally extending resilient member and deflecting said planar resilient member occur concurrently.

53. The method as claimed in Claim 51 wherein said steps of deflecting said longitudinally extending resilient member and deflecting said planar resilient member occur sequentially.

54. A method of fixing a position from input gained by contact with an object, then utilizing said position to perform work on said object, said method comprising the steps of:
    positioning said object in close proximity to a position detecting apparatus that has a base structure, a transfer platform, a slide assembly, and a plurality of probes;
    moving said transfer platform toward said object in a first direction;
    guiding said transfer platform in said first direction along a first linear guideway while maintaining a first slidable coupling having a first clamping means mounted to said transfer platform and circumscribing a longitudinally extending resilient member mounted to said base structure;
    contacting said object with one of said plurality of probes while said transfer platform is being moved and guided in said first direction;
    contacting said object with a second of said plurality of probes while said transfer platform is being moved and guided in said first direction;
    moving said slide assembly of said position detecting apparatus in a second direction perpendicular to said first direction in response to said second of said plurality of probes contacting said object;
    guiding said slide assembly in said second direction along a second linear guideway while maintaining a second slidable coupling having a second clamping means adjacent a planar resilient member, said planar resilient member being supported adjacent said slide assembly by said transfer platform;
    contacting said object with a third of said plurality of probes while said transfer platform is being moved and guided in said first direction;
    moving said slide assembly of said position detecting apparatus in a third direction perpendicular to said first and second directions in response to said third of said plurality of probes contacting said object;

guiding said slide assembly in said third direction along a third linear guideway while maintaining said second slidable coupling having said second clamping means adjacent said planar resilient member;

immobilizing said position detecting apparatus to preserve its position as determined by said plurality of probes, said immobilizing comprising the steps of:

deflecting said longitudinally extending resilient member with said first clamping means to create frictional interference therebetween, said frictional interference immobilizing said transfer platform; and deflecting said planar resilient member with said second clamping means to create frictional interference therebetween, said frictional interference immobilizing said slide assembly; and performing work on said object relative to said immobilized position.

55. The method as claimed in claim 54 wherein said steps of deflecting said longitudinally extending resilient member and deflecting said planar resilient member occur concurrently.

56. The method as claimed in claim 54 wherein said steps of deflecting said longitudinally extending resilient member and deflecting said planar resilient member occur sequentially.

57. A method of fixing a position from input gained by contact with an automobile body, then utilizing said position to perform work on said automobile body, said method comprising the steps of:

moving said automobile body along a linear assembly line, said automobile body in fixed relationship to said linear assembly line;

immobilizing said automobile body in close proximity to a position detecting apparatus that has a base structure, a transfer platform, a slide assembly, and at least one probe;

moving said transfer platform toward said automobile body in a first direction;

guiding said transfer platform in said first direction along a first linear guideway while maintaining a first slidable coupling having a first clamping means mounted to said transfer platform and circumscribing a longitudinally extending resilient member mounted to said base structure;

contacting said automobile body with said at least one probe while said transfer platform is being moved and guided in said first direction;

moving said slide assembly of said position detecting apparatus in a second direction perpendicular to said first direction in response to said at least one probe contacting said automobile body;

guiding said slide assembly in said second direction along a second linear guideway while maintaining a second slidable coupling having a second clamping means adjacent a planar resilient member, said planar resilient member being supported adjacent said slide assembly by said transfer platform;

moving said slide assembly of said position detecting apparatus in a third direction perpendicular to said first and second directions in response to said at least one probe contacting said automobile body;

guiding said slide assembly in said third direction along a third linear guideway while maintaining said second slidable coupling having said second clamping means adjacent said planar resilient member;

immobilizing said position detecting apparatus to preserve its position as determined by said at least one probe, said immobilizing step further comprising the steps of:

deflecting said longitudinally extending resilient member with said first clamping means to create frictional interference therebetween, said frictional interference immobilizing said transfer platform; and deflecting said planar resilient member with said second clamping means to create frictional interference therebetween, said frictional interference immobilizing said slide assembly; and performing work on said automobile body relative to said immobilized position.

58. The method as claimed in claim 57 wherein said first direction is perpendicular to said linear assembly line.

59. The method as claimed in claim 57 wherein said steps of deflecting said longitudinally extending resilient member and deflecting said planar resilient member occur concurrently.

60. The method as claimed in claim 57 wherein said steps of deflecting said longitudinally extending resilient member and deflecting said planar resilient member occur sequentially.

61. A method of fixing a plurality of positions from input acquired by contact with an object, then utilizing said positions to perform work on said object, said method comprising the steps of:

positioning said object in close proximity to first and second position detecting apparatuses, each of said first and second position detecting apparatuses having a base structure, a transfer platform, a slide assembly, and at least one probe;

moving said transfer platform of each said first and second position detecting apparatuses toward said object in a first direction;

guiding each said transfer platform in said first direction along a corresponding first linear guideway while maintaining a first slidable coupling having a corresponding first clamping means mounted to each said transfer platform and circumscribing a corresponding longitudinally extending resilient member mounted to each said base structure;

contacting said object with a corresponding one of said at least one probe of each said first and second position detecting apparatuses while each said transfer platform is being moved and guided in said first direction;

moving said slide assembly of each said first and second position detecting apparatuses in a second direction perpendicular to said first direction in response to said corresponding one of said at least one probe contacting said object;

guiding each said slide assembly in said second direction along a corresponding second linear guideway while maintaining a second slidable coupling having a corresponding second clamping means adjacent a corresponding planar resilient member, each said planar resilient member being supported adjacent a corresponding slide assembly by a corresponding transfer platform;

moving said slide assembly of each said first and second position detecting apparatuses in a third direction perpendicular to said first and second directions in response to said corresponding one of said at least one probe contacting said object;

guiding each said slide assembly in said third direction along a corresponding third linear guideway while maintaining said second slidable coupling having said corresponding second clamping means adjacent said corresponding planar resilient member;

immobilizing each said first and second position detecting apparatuses to preserve a first immobilized position and a second immobilized position, respectively, as determined by said corresponding one of said at least one probe, said immobilizing step further comprising the steps of:

deflecting each said corresponding longitudinally extending resilient members with said corresponding first clamping means to create frictional interference therebetween, said frictional interference immobilizing each said transfer platform; and deflecting each said corresponding planar resilient member with said corresponding second clamping means to create frictional interference therebetween, said frictional interference immobilizing each said slide assembly; and referencing said first and second immobilized positions of said first and second position detecting apparatuses so that work can be performed on said object in reference thereto.

62. The method as claimed in claim 61 wherein said steps of deflecting each said corresponding longitudinally extending resilient member and deflecting each said planar resilient member occurs concurrently.

63. The method as claimed in Claim 61 wherein said steps of deflecting each said corresponding longitudinally extending resilient member and deflecting each said corresponding planar resilient member occurs sequentially.

64. A method of fixing a plurality of positions from input acquired by contact with an automobile body, then utilizing said plurality of positions to perform work on said automobile body, said method comprising the steps of:

moving said automobile body along a linear assembly line, said automobile body being in a fixed relationship to said linear assembly line;

immobilizing said automobile body in close proximity to and between first and second position detecting apparatuses, each of said position detecting apparatuses having a base structure, a transfer platform, a slide assembly, and at least one probe;

moving said transfer platform of each said first and second position detecting apparatuses toward said automobile body in a first direction;

guiding each said transfer platform in said first direction along a corresponding first linear guideway while maintaining a first slidable coupling having a corresponding first clamping means mounted to each said transfer platform and circumscribing a corresponding longitudinally extending resilient member mounted to each said base structure;

contacting said automobile body with a corresponding one of said at least one probe of each said first and second position detecting apparatuses while each said transfer platform is being moved and guided in said first direction;

moving said slide assembly of each said first and second position detecting apparatuses in a second direction perpendicular to said first direction in response to said corresponding one of said at least one probe contacting said automobile body;

guiding each said slide assembly in said second direction along a corresponding second linear guideway while maintaining a second slidable coupling having a corresponding second clamping means adjacent a corresponding planar resilient member, each said planar resilient member being supported adjacent a corresponding slide assembly by a corresponding transfer platform;

moving said slide assembly of each said first and second position detecting apparatuses in a third direction perpendicular to said first and second directions in response to said corresponding one of said at least one probe contacting said automobile body;

guiding each said slide assembly in said third direction along a corresponding third linear guideway while maintaining said second slidable coupling having said corresponding second clamping means adjacent said corresponding planar resilient member;

immobilizing each said first and second position detecting apparatuses to preserve a first immobilized position and a second immobilized position, respectively, as determined by said corresponding one of said at least one probe, said immobilizing step further comprising the steps of:

deflecting each said corresponding longitudinally extending resilient member with said corresponding first clamping means to create frictional interference therebetween, said frictional interference immobilizing each said transfer platform; and deflecting each said corresponding planar resilient member with said corresponding second clamping means to create frictional interference therebetween, said frictional interference immobilizing each said slide assembly; and referencing said first and second immobilized positions of said first and second position detecting apparatuses so that work can be performed on said automobile body in reference thereto.

65. The method as claimed in Claim 64 wherein said first direction is perpendicular to said linear assembly line.

66. The method as claimed in Claim 64 wherein said steps of deflecting each said corresponding longitudinally extending resilient member and deflecting each said planar resilient member occurs concurrently.

67. The method as claimed in Claim 64 wherein said steps of deflecting each said corresponding longitudinally extending resilient member and deflecting each said corresponding planar resilient member occurs sequentially.

* * * * *